United States Patent
Lee et al.

(10) Patent No.: US 7,271,807 B2
(45) Date of Patent: Sep. 18, 2007

(54) METHOD FOR GENERATION OF 2-DIMENSIONAL MOTION PATH

(75) Inventors: Joo Haeng Lee, Taejon (KR); Hyun Kim, Taejon (KR); Hyoung Sun Kim, Taejon (KR); Jin Mi Jung, Choongchungbuk-Do (KR)

(73) Assignee: Electronics and Telecommunications Research Institute, Taejon (KR)

( * ) Notice: Subject to any disclaimer, the term of this patent is extended or adjusted under 35 U.S.C. 154(b) by 617 days.

(21) Appl. No.: 10/824,542

(22) Filed: Apr. 15, 2004

(65) Prior Publication Data

US 2005/0143963 A1 Jun. 30, 2005

(30) Foreign Application Priority Data

Dec. 24, 2003 (KR) .............. 10-2003-0097011

(51) Int. Cl.
 *G06T 13/00* (2006.01)
(52) U.S. Cl. .................................. 345/473
(58) Field of Classification Search ............ 345/473, 345/474; 382/154; 356/73.1
See application file for complete search history.

(56) References Cited

U.S. PATENT DOCUMENTS

| | | | | |
|---|---|---|---|---|
| 5,179,419 A | * | 1/1993 | Palmquist et al. | 356/73.1 |
| 5,696,674 A | * | 12/1997 | Trovato et al. | 345/473 |
| 5,717,848 A | * | 2/1998 | Watanabe et al. | 345/474 |
| 5,764,241 A | * | 6/1998 | Elliott et al. | 345/473 |
| 5,808,887 A | * | 9/1998 | Dorst et al. | 345/474 |
| 6,229,552 B1 | * | 5/2001 | Koga et al. | 345/474 |
| 6,307,959 B1 | * | 10/2001 | Mandelbaum et al. | 382/154 |
| 7,127,100 B2 | * | 10/2006 | Wenzel et al. | 382/154 |

FOREIGN PATENT DOCUMENTS

| | | |
|---|---|---|
| KR | 2001-58236 | 7/2001 |
| KR | 2003-49298 | 6/2003 |

OTHER PUBLICATIONS

J.-H. Lee, et al.; "Interactive Control of Geometric Shape Morphing based on Minkowski Sum"; Korean CAD/CAM Institute Thesis Collection.

* cited by examiner

*Primary Examiner*—Almis R. Jankus
(74) *Attorney, Agent, or Firm*—Lowe Hauptman Ham & Berner LLP

(57) ABSTRACT

A method for simultaneous generation of motion paths depending on changes of internal and external sizes of an object by a direction map for a 2-dimensional geometric figure, includes respectively expressing specific obstacle A and object B inputted through an input unit, by direction maps; merging the direction maps respectively expressing the obstacle and the object; determining Minkowski operation after sizes of the obstacle and the object are determined; performing a necessary group unit based size control operation for a direction map obtained by merging each of the direction maps of the obstacle and the object in the second step; performing collinear elimination for the result obtained in the fourth step, performing a direction map inverse operation, and performing a trimming operation to generate the motion path; and calculating a c-space obstacle for obstacle and object having different external and internal sizes.

14 Claims, 6 Drawing Sheets

METHOD FOR GENERATION OF 2-DIMENSIONAL MOTION PATH

BACKGROUND OF THE INVENTION

1. Field of the Invention

The present invention relates to a method for effective generation and calculation of a 2-dimensional motion path applied to a computer, and more particularly, to a method in which a direction map is used to calculate a 2-dimensional convolution and to finally generate a configuration-space obstacle (or c-space obstacle) so as to solve a problem caused in generating a 2-dimensional motion path that requests to move on 2-dimension without collision between obstacles.

2. Description of the Related Art

Generally, a c-space obstacle is a mathematical curve that is defined using convolution (represented by *) or Minkowski addition (represented by $\oplus$) and Minkowski subtraction (represented by $\ominus$) operations on basis of calculation geometry.

For example, the c-space obstacle for the obstacle A and the object B is defined as a curve $\partial P$ such as the following Equation 1.

$$\mathrm{TRIM}(\partial A * \partial(-B)) = \partial(A \oplus (-B)) = \partial P_{out} \qquad [\text{Equation 1}]$$

Well known is mathematically a fact that if the object B moves along a path $\partial P_{out}$ according to the Equation 1, a collision with the obstacle A is not generated. In the Equation 1, the −B means that the object is rotated by 180 degree with respect to the origin.

However, in the above Equation, the convolution, the TRIM, and Minkowski addition are very complex operations and has rather much calculation amount. Furthermore, when the size of the obstacle or the object is variable, the path $\partial P_{out}$ should be calculated in every case.

Further, the calculation method is different depending on whether a motion range of the object belongs to an internal or external of the obstacle. For example, the Equation 1 is a method for calculating the path of the object at the external of the obstacle, but Minkowski subtraction operation should be used as in Equation 2 so as to calculate the path at the internal of the obstacle. In the Equation 2, when the object B moves along the $\partial p_{out}$ at the internal of the obstacle A, a collision with a boundary of the A is not generated.

$$\mathrm{TRIM}((\partial A^{r*} \partial(-B))^r) = \partial(A \ominus (-B)) = \partial P_e \qquad [\text{Equation 2}]$$

However, a practical method is almost not known until now in which the above one paired Minkowski addition and subtraction are simultaneously calculated using the convolution operation or other ways.

SUMMARY OF THE INVENTION

Accordingly, the present invention is directed to a method for generation of a 2-dimensional motion path, which substantially obviates one or more problems due to limitations and disadvantages of the related art.

It is an object of the present invention to provide a method for generation of a 2-dimensional motion path in which a direction map for a 2-dimensional geometric figure is used to simultaneously generate internal and external motion paths of an object, and effectively to generate various motion paths in case that the size of the object is changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for simultaneous generation of motion paths depending on changes of internal and external sizes of an object by a direction map for a 2-dimensional geometric figure, the method including: a first step of respectively expressing specific obstacle A and object B inputted through an input unit, by direction maps; a second step of merging the direction maps respectively expressing the obstacle and the object; a third step of determining Minkowski operation after sizes of the obstacle and the object are determined; a fourth step of performing a necessary group unit based size control operation for a direction map obtained by merging each of the direction maps of the obstacle and the object in the second step; a fifth step of performing collinear elimination for the result obtained in the fourth step, performing a direction map inverse operation, and performing a trimming operation to generate the motion path; and a sixth step of calculating a c-space obstacle for obstacle and object having different external and internal sizes.

The method for generation of generation of the 2-dimensional motion path according to the present invention uses a geometric property of the c-space obstacle to effectively generate the internal and external motion paths for the complex obstacle, and the motion paths for various sizes of objects without deriving a complex and difficult equation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
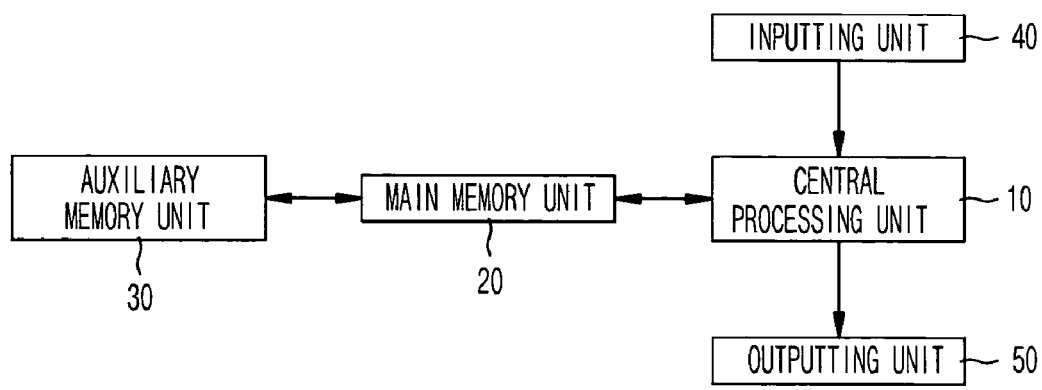
FIG. 1 is a view illustrating a general computer system for embodying a method for generation of a 2-dimensional motion path according to the present invention.

FIG. 1 is a view illustrating a general computer system for embodying a method for generation of a 2-dimensional motion path according to the present invention.

Referring to the drawing, the computer system includes a central processing unit 10 for controlling an entire computer system; a main memory unit 20 for storing all data necessary for development execution therein; an auxiliary memory unit 30 for temporarily storing therein and outputting work data therefrom depending on a control of the central processing unit; an inputting unit 40 for commanding a motion to the central processing unit 10 depending on worker's manipulation; and an outputting unit 50 for displaying a work state.

The method for generation of the 2-dimensional motion path that the present invention intends to disclose is programmed to be stored in a recording media in a computer-readable format. The program stored in the recording media is managed on the computer such that a direction map is used for a 2-dimensional geometric figure inputted through the inputting unit 40 to simultaneously generate internal and external motion paths of an object, and effectively generate various motion paths in case that a size of the object is changed.

Figure 2:
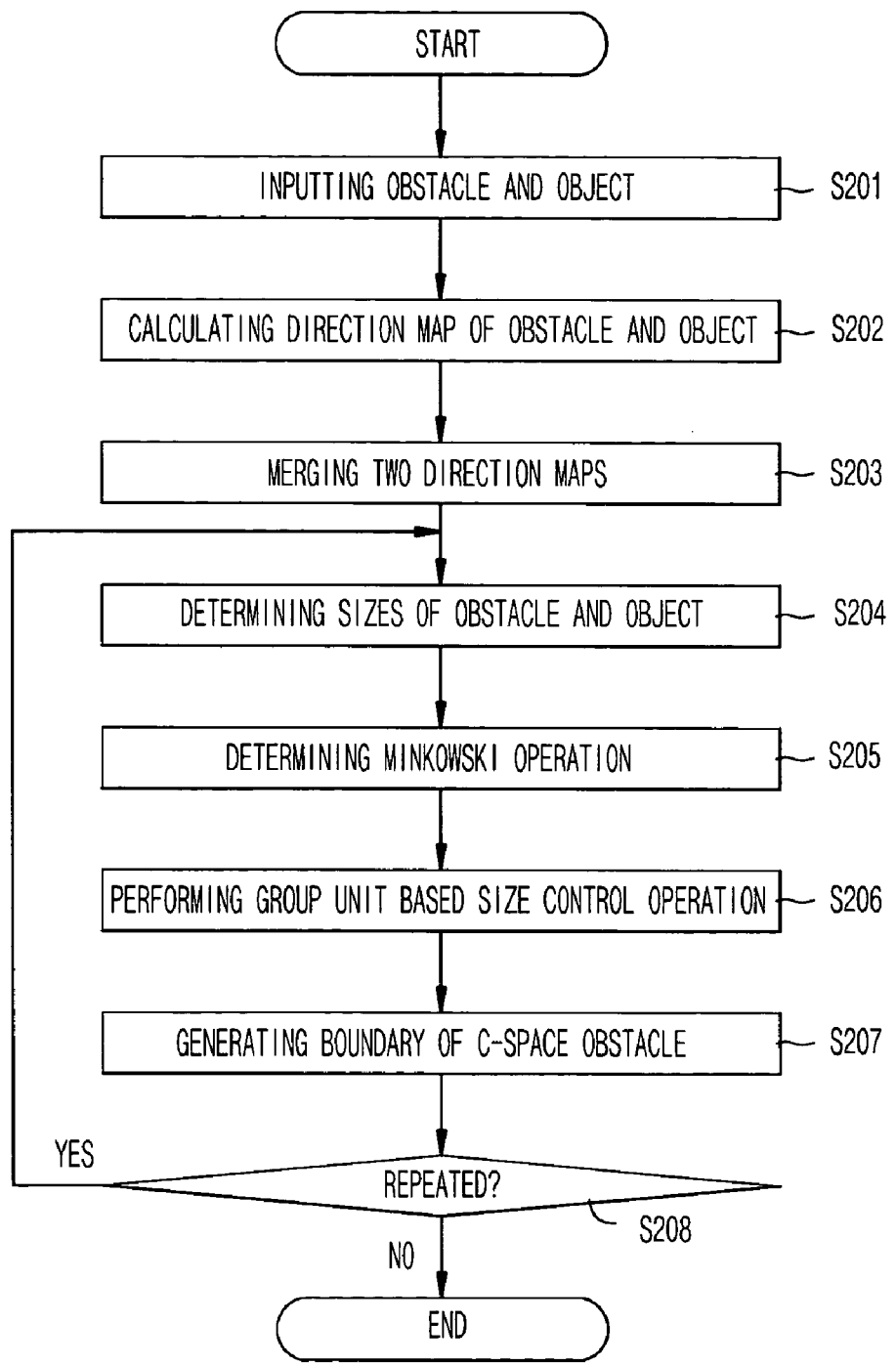
FIG. 2 is a flow chart illustrating a method for generation of a 2-dimensional motion path according to the present invention.

FIG. 2 is a flow chart illustrating the method for generation of the 2-dimensional motion path according to the present invention.

Referring to FIG. 2, the method for simultaneous generation of the motion paths depending on changes of the internal and external sizes of the object by using the direction map for the 2-dimensional geometric figure according to the present invention includes: a first step of expressing specific obstacle A and object B inputted through an input unit, by direction maps; a second step of merging the direction maps respectively expressing the obstacle and the object; a third step of determining Minkowski operation after sizes of the obstacle and the object are determined; a fourth step of performing a necessary group unit based size control operation for a direction map obtained by merging respective direction maps of the obstacle and the object in the second step; a fifth step of performing collinear elimination for the result obtained in the fourth step, performing a direction map inverse operation, and generating the motion path by trimming operation; and a sixth step of calculating a c-space obstacle for the obstacle and the object different external and internal sizes.

Hereinafter, in order to be helpful for understanding in programming to enable the method for generation of the 2-dimensional motion path to be executed in the computer, simple mathematical definitions are arranged.

The present invention expresses a boundary of an obstacle and an object, as a polygonal. If the direction map can be defined for a curve boundary, the present invention can be extended and applied to the obstacle and the object of the curve boundary.

For one example, the polygonal is expressed by a series of sequential vertices. Two adjacent vertices form one line segment of the polygonal. It is assumed that a polygonal boundary is always in clockwise orientation when it is not a case of expressing a hole. Accordingly, an $i^{th}$ vertex $v_i$ is also stored in a circular arrangement in this sequence. This is a general well-known method for expressing the polygonal.

For the polygonal boundary, the direction map is comprised of a series of direction vectors. The direction vector $d_i$ is a vector for connecting two adjacent vertices $v_i$ and $v_{i+1}$. Accordingly, the direction vector $d_i$ can be expressed in the following Equation 3.

$$d_i = v_{i+1} - v_i \qquad \text{[Equation 3]}$$

A "TDC" operation means a complex operation as in the following Equation 4 for expression convenience.

$$TDC = TRIM \cdot DM^{-1} \cdot CC \qquad \text{[Equation 4]}$$

Referring to FIG. 4, the "DM" means an operation for extracting the direction map from the figure, the "GS" means a group unit based size control operation, the ⊎* means a convolution merge of the direction map, and the "TRIM" means an operation for eliminating an unnecessary portion of a self-cross and the like existing at the boundary.

Besides, since detailed contents for the definition and a related operation of the direction map are not essential for the present invention and also the definition is already known, a detailed description for this is omitted.

The boundary of Minkowski addition for the A and the B can be expressed using the operation of the direction map as in the following Equation 5.

$$\begin{aligned}
\partial(A_0 \oplus A_1) &= TRIM(\partial A_0 * \partial A_1) \qquad \text{[Equation 5]} \\
&= TDC(D_0 \uplus * D_1) \\
&= TDC(GS(D_0 \uplus * D_1, 1, 1)) \\
&= TDC(GS(D_s, 1, 1)).
\end{aligned}$$

Further, Minkowski subtraction for the A and the −B can be expressed using a relation with Minkowski addition and a property of the direction map operation as in the following Equation 6.

$$\begin{aligned}
\partial(A_0 \ominus (-A_1)) &= \partial((A_0^c \uplus (-A_1))^c) \qquad \text{[Equation 6]} \\
&= TRIM((\partial A_0^c * \partial(-A_1)^c) \\
&= TDC((D_0^c \uplus * (-D_1))^c) \\
&= TDC(GS(D_0 \uplus * D_1, 1, -1)) \\
&= TDC(GS(D_s, 1, -1)).
\end{aligned}$$

Referring to the Equations. 5 and 6, it is understood that Minkowski addition and subtraction can be calculated using the same merged direction map $D_s$. However, only a direction of the direction vector is changed in the group unit based size control operation. That is, in case of Minkowski subtraction, −1 is multiplied to the direction vectors from the $D_0$ among the direction vectors of the merged direction map $D_s$ to turn in an opposite direction as in the Equation 6.

The Equations 5 and 6 show that two direction maps are convolution-merged and its result is reused such that specific Minkowski addition and subtraction can be calculated in one pair. This can be accomplished due to a newly provided method of the present invention where the boundary of the object is expressed by the direction map and the direction vector in a vector space without being expressed using a point of a wide area coordinate system.

Arranging and extending the above relation, it can be understood that the direction map and Minkowski operation generally has a relation as in the following Equations 7 to 10. Herein, $D_s=D_0 \uplus D_1$.

$$TDC(GS(D_s, 1, 1))=\partial(A_0 \oplus A_1), \quad \text{[Equation 7]}$$

$$TDC(GS(D_s, 1, -1))=\partial(A_0 \ominus -A_1), \quad \text{[Equation 8]}$$

$$TDC(GS(D_s, -1, 1))=\partial(A_1 \ominus -A_0), \quad \text{[Equation 9]}$$

$$TDC(GS(D_s, -1, -1))=\partial(A_0 \oplus -A_1), \quad \text{[Equation 10]}$$

Referring to the Equations 7 to 10, the above Equations all represent four Minkowski operations in which simultaneous calculation can be performed for the same merged direction map $D_s$. If −1 is multiplied at both sides of the Equation 7, the Equation 10 is obtained. The Equations 8 and 9 also have the same relation. Therefore, only Equations 7 and 8 have a substantial difference therebetween.

The Equation 7 means the motion path on which an object $-A_1$ can move without a collision at an external of an obstacle $A_0$. That is, if the $-A_1$ moves beyond the boundary, it collides with the obstacle.

The Equation 8 means a motion path on which an object $A_1$ can move without a collision at an internal of the obstacle $A_0$. That is, the $A_1$ moves beyond the boundary, it collides with the obstacle.

Further, arranging and extending the above relation, it can be understood that the direction map and Minkowski operation generally has a relation as in the following Equations 11 to 14. Herein, $D_d=-D_0 \uplus D_L$.

$$TDC(GS(D_d, 1, 1))=\partial(-A_0 \oplus A_1), \quad \text{[Equation 11]}$$

$$TDC(GS(D_d, 1, -1))=\partial(-A_1 \ominus -A_0), \quad \text{[Equation 12]}$$

$$TDC(GS(D_d, -1, 1))=\partial(A_0 \ominus A_1), \quad \text{[Equation 13]}$$

$$TDC(GS(D_d, -1, -1))=\partial(A_0 \oplus -A_1), \quad \text{[Equation 14]}$$

Referring to the Equations 11 to 14, the above Equations all represent four Minkowski operations in which simultaneous calculation can be performed for the same merged direction map $D_d$. Only the Equations 11 and 12 have a substantial difference therebetween.

Similarly with the Equations 7 to 10, the Equations 12 to 14 represent a collision relation of the object and the obstacle. That is, the Equation 14 represents a path on which the object $A_1$ can move at the external of the obstacle $A_0$. The Equation 13 represents a path on which the object $-A_1$ can move at the internal of the obstacle $A_0$.

FIG. 3 is an exemplary view illustrating a motion path that is calculated using the above-mentioned Minkowski operation.

Figure 3A:
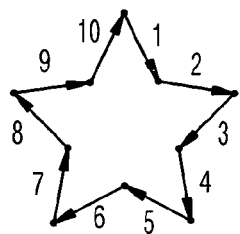
FIG. 3 is an exemplary view illustrating a process for simultaneous generation of a boundary pair according to the present invention.
Figure 3B:
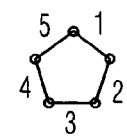
Figure 3C:
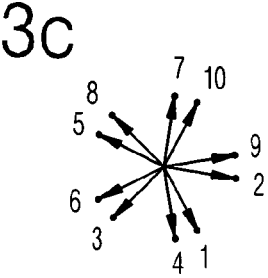
Figure 3D:
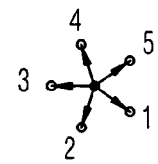

FIG. 3A illustrates a star-shaped obstacle. FIG. 3B illustrates a pentagon-shaped moving object. FIG. 3C illustrates the direction map $D_0$ of the object. FIG. 3D illustrates the direction map $D_1$ of the object.

Figure 3E:
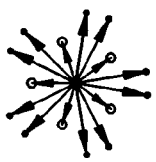

When $D_s=D_0 \uplus D_1$, FIG. 3E illustrates a result of $GS(D_s, 1, 1)$

Figure 3F:
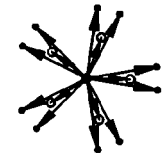

FIG. 3F illustrates a result of $GS(D_s, 1, -1)$

Figure 3G:
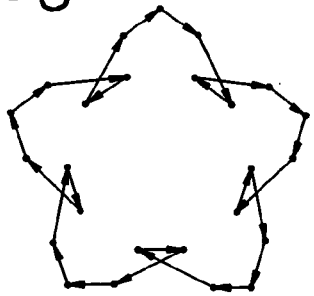

FIG. 3G illustrates a result of applying an inverse operation of the direction map to the result of FIG. 3E, and is a case that the self-cross is generated.

Figure 3H:
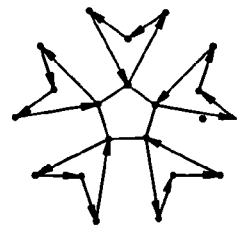

FIG. 3H illustrates a result of applying the inverse operation of the direction map to the result of FIG. 3F, and is a case that the self-cross is generated.

Figure 3I:
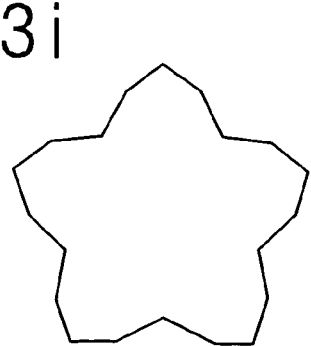

FIG. 3I is the boundary obtained using TDC(GS($D_s$, 1, 1)), and is a result of $\partial(A_0 \oplus A_1)$. This is a c-space obstacle for allowing the object $-A_1$ to move without the collision at the external of $A_0$ as in FIG. 4A.

Figure 3J:
Figure 4A:
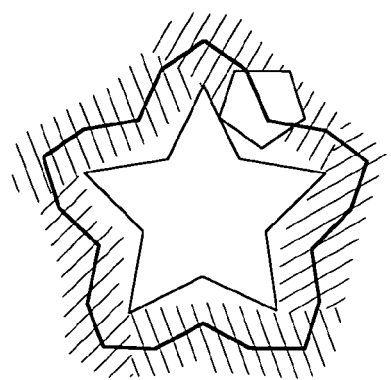
FIG. 4 is an exemplary view illustrating a result of simultaneous generation of a boundary pair according to the present invention.
Figure 4B:
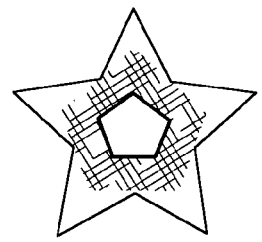
Figure 4C:
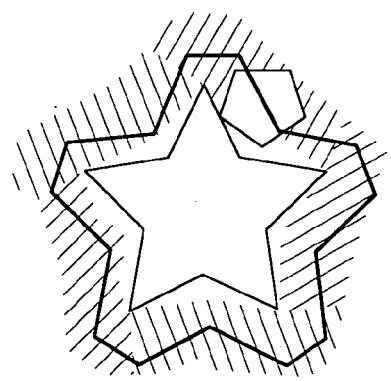
Figure 4D:
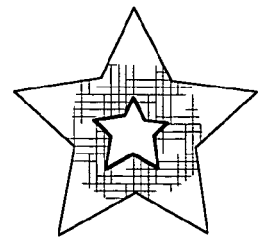

FIG. 3J is the boundary obtained using TDC(GS($D_s$, 1, −1)), and is a result of $\partial(A_0 \ominus -A_1)$. This is a c-space obstacle for allowing the object $A_1$ to move without the collision at the internal of $A_0$ as in FIG. 4B. When $D_d=-D_0 \uplus *D_1$, FIG. 4C illustrates a result of TDC(GS($D_d$, −1, −1))=$\partial(A_0 \oplus -A_1)$, and is a c-space obstacle for allowing the $-A_1$ to move without the collision at the external of the $A_0$. FIG. 4C is a result of TDC(GS($D_d$, −1, 1))=$\partial(A_0 \ominus A_1)$, and is a c-space obstacle for allowing the $-A_1$ to move without the collision at the internal of the $A_0$.

Even in case that the obstacle or the object has the same shape and has the same size, the direction map can be reused. When sizes of the obstacle and the object are respectively changed into α and β, the Equations can be changed as follows.

$$TDC(GS(D_s, \alpha, \beta))=\partial(\alpha A_0 \oplus \beta A_1), \quad \text{[Equation 15]}$$

$$TDC(GS(D_s, \alpha, -\beta))=\partial(\alpha A_0 \ominus -\beta A_1), \quad \text{[Equation 16]}$$

$$TDC(GS(D_s, \{-\alpha, \beta\}))=\partial(\beta A_1 \ominus -\alpha A_0), \quad \text{[Equation 17]}$$

$$TDC(GS(D_s, -\alpha, -\beta))=\partial(-\alpha A_0 \oplus -\beta A_1), \quad \text{[Equation 18]}$$

Similarly, the Equations can be changed as follows.

$$TDC(GS(D_d, \alpha, \beta))=\partial(-\alpha A_0 \oplus \beta A_1), \quad \text{[Equation 19]}$$

$$TDC(GS(D_d, \alpha, -\beta))=\partial(\beta A_1 \ominus -\alpha A_1), \quad \text{[Equation 20]}$$

$$TDC(GS(D_d, -\alpha, \beta))=\partial(\alpha A_0 \ominus \beta A_1), \quad \text{[Equation 21]}$$

$$TDC(GS(D_d, -\alpha, -\beta))=\partial(\alpha A_0 \ominus \beta A_1), \quad \text{[Equation 22]}$$

In an application field of the motion path, there are many cases in which calculation is instead performed using a representative figure (convex hull) surrounding the moving object in case that an external shape of the moving object is complex. Further, since this representative figure has an origin-symmetric shape, a majority of cases are $A_1=-A_1$.

For example, in case that the $A_1$ is a circle, the boundary of Minkowski operation pair corresponds to external and internal offset pairs of the object $A_0$.

For the obstacle $A_0$ and the circle $A_1$ having a radius 1, an offset curve pair of a radius R(t) can be calculated as follows.

$$D=DM(A_0) \uplus DM(A_1) \quad \text{[Equation 23]}$$

$$TDC(GS(D, 1, -R(t))=\partial(A_0 \oplus (R(t) \cdot A_1))=O_{out}(R(t)) \quad \text{[Equation 24]}$$

$$TDC(GS(D, 1, -R(t))=\partial(A_0 \ominus (R(t) \cdot A_1))=O_\epsilon(R(t)) \quad \text{[Equation 25]}$$

In the above Equation, the $O_{out}(R(t))$ and the $O_\epsilon(R(t))$ respectively mean the external and internal offsets of the radius R(t).

The $O_{out}(R(T))$ means a path on which the object can move within the radius R(t) without the collision at the external of the obstacle $A_0$. In the $O_{out}((R(t))$, if the object moves toward the boundary of the $A_0$, the collision with the $A_0$ is generated.

The $O_\epsilon((R(t))$ means a path on which the object can move within the radius R(t) without the collision at the internal of the obstacle $A_0$. In the $O_\epsilon((R(t))$, if the object moves toward the boundary of the $A_0$, the collision with the $A_0$ is generated.

Figure 5:
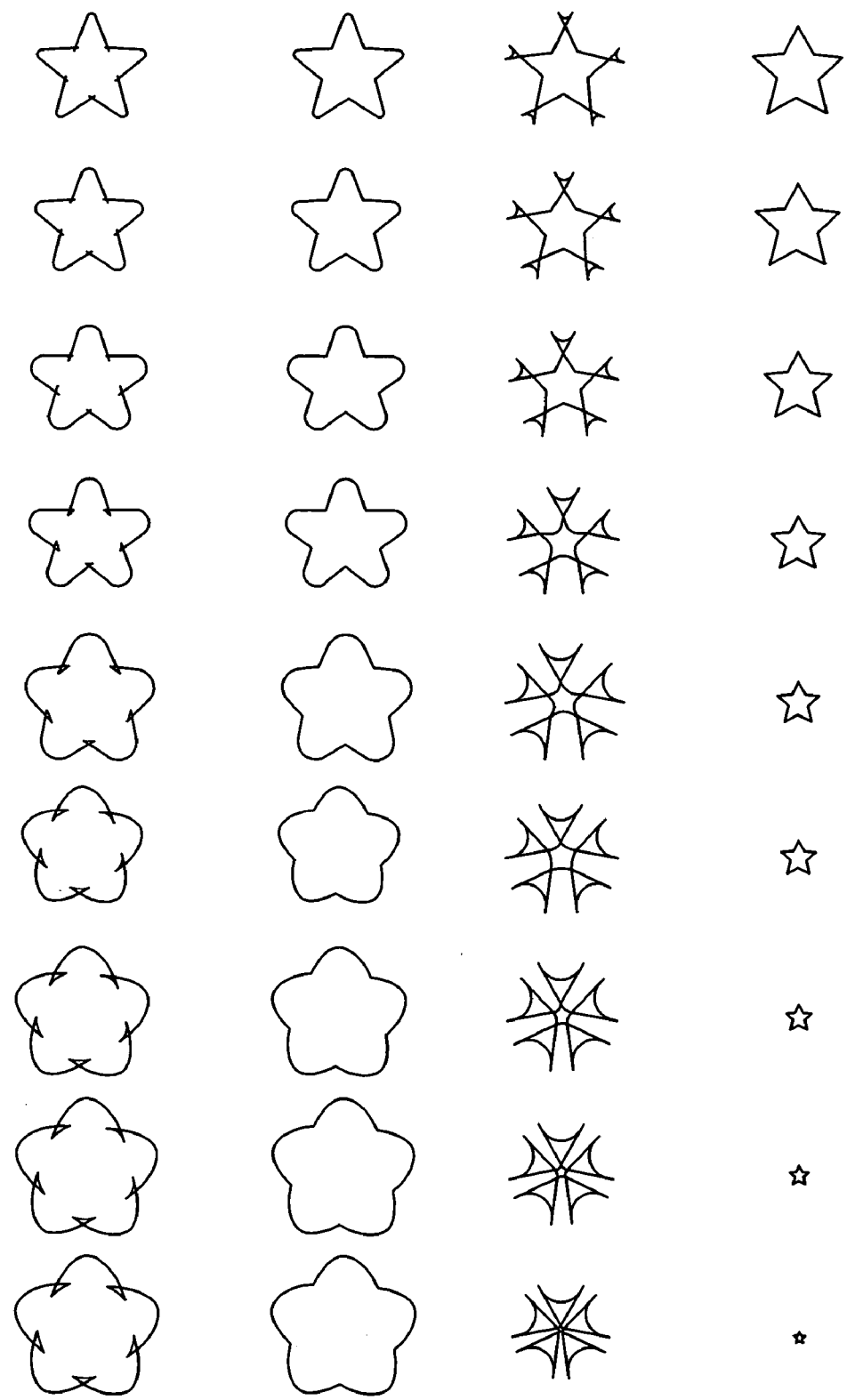
FIG. 5 is an exemplary view illustrating a process for simultaneous generation of an internal/external offset according to the present invention.

FIG. 5 shows an example of calculating the offset pair of the radius between [$R_{min}$, $R_{max}$] for the star-shaped figure $A_0$ by using the Equations 23 to 25. FIGS. 5A and 5B illustrate the offset boundaries before trimming. FIGS. 5C and 5D illustrate examples of calculating the external and internal offsets after the offsets of FIGS. 5A and 5B are trimmed. All offsets of FIGS. 5C and 5D reuse the merged direction map of the Equation 23 to be calculated by respectively using the Equations 24 and 25. Accordingly, the internal/external offsets can be calculated using one merge map irrespective of the radius.

However, the trimming should individually be calculated for each of the boundaries. This is identical with a conventional method, but a fast and simply convenient trimming method based on the direction map is known.

Figure 6:
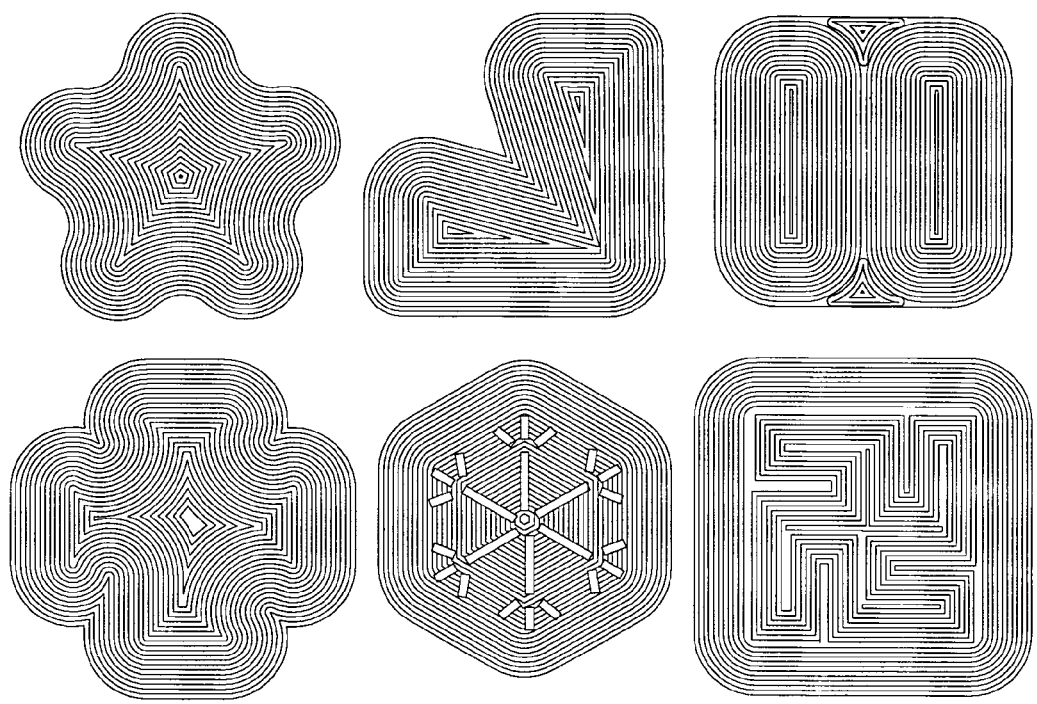
FIG. 6 is an exemplary view illustrating a result of simultaneous generation of an internal/external offset according to the present invention.

FIG. 6 illustrates examples of various offset curves. In a picture, a bold line means the obstacle, and a fine line means the path on which the objects having various radiuses can avoid the obstacle for movement.

The above-described inventive method for generation of the 2-dimensional motion path is arranged with reference to FIG. 2 as follows.

Referring to the drawing, first of all, the present invention receives geometrical information on the obstacle and the object (S201).

The direction maps of the obstacle and the object received are calculated (S202).

The two calculated direction maps are convolution-merged (S203).

A size is determined on basis of the shapes of the received obstacle and object. The size is determined with two real number values. In case of the offset, the size R(t) of the object is determined (S204).

In a state where the shape and the size are determined, a kind of Minkowski operation (that is, addition or subtraction) to be applied is determined. In this step, in case of the offset, the external or internal offset is determined (S205).

According to the kind of the determined operation, the appropriate one is selected from the Equations 15 to 22 for calculation. Particularly, in case of the offset operation, the appropriate one is selected from the Equation 24 or 25 (S206).

It corresponds to the "TDC" operation. That is, the boundary of the new figure is obtained from the new direction map obtained as the result of the step 206 through the trimming and the inverse operation of the direction map (S207).

Additionally, the present invention resumes at the step 204 in case that the merged direction map obtained from the step 203 is reused (S208).

The above-described inventive method for generation of the 2-dimensional motion path is programmed and is stored and used in the recording media in the computer-readable format.

As described above, the method for generation of the 2-dimensional motion path according to the present invention can express the boundary of the 2-dimensional geometric figure expressing the obstacle and the object by the direction map, merge two direction maps to generate the new merged direction map through the size control of the direction vector, and calculate the boundary of the c-space obstacle from the new direction map.

As a result, the geometric property for the c-space obstacle is used to generate the internal and external motion paths for the complex obstacle, and simultaneously effectively to generate the motion path for the sizes of various objects without deriving the complex and difficult equation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for simultaneous generation of motion paths depending on changes of internal and external sizes of an object by a direction map for a 2-dimensional geometric figure, the method comprising:

a first step of respectively expressing specific obstacle A and object B inputted through an input unit, by direction maps;

a second step of merging the direction maps respectively expressing the obstacle and the object;

a third step of determining Minkowski operation after sizes of the obstacle and the object are determined;

a fourth step of performing a necessary group unit based size control operation for a direction map obtained by merging each of the direction maps of the obstacle and the object in the second step;

a fifth step of performing collinear elimination for the result obtained in the fourth step, performing a direction map inverse operation, and performing a trimming operation to generate the motion path; and a sixth step of calculating a c-space obstacle for obstacle and object having different external and internal sizes.

2. The method of claim 1, wherein in the fourth step, the boundary of Minkowski addition operation for the obstacle A and the object B is determined using a merged direction map $D_s$ and a group unit based size control operation by the following Equation:

$$\partial(A_0 \oplus A_1) = TRIM(\partial A_0 * \partial A_1)$$
$$= TDC(D_0 \uplus * D_1)$$
$$= TDC(GS(D_0 \uplus * D_1, 1, 1))$$
$$= TDC(GS(D_s, 1, 1)),$$

herein, the "GS" is the group unit based size control operation, the $\uplus^*$ is a convolution-merge of the direction map, the "TRIM" is an operation for eliminating an unnecessary portion of a self-cross and the like existing at the boundary, and the "1, 1" is a factor of the group unit based size control operation.

3. The method of claim 1, wherein in the fourth step, the boundary of Minkowski subtraction operation for the obstacle A and the object −B is determined using the merged direction map $D_s$ and the group unit based size control operation by the following Equation:

$$\partial(A_0 \ominus (-A_1)) = \partial((A_0^c \uplus (-A_1))^c)$$
$$= TRIM((\partial A_0^c * \partial(-A_1)^c)$$
$$= TDC((D_0^c \uplus * (-D_1))^c)$$
$$= TDC(GS(D_0 \uplus * D_1, 1, -1))$$
$$= TDC(GS(D_s, 1, -1)),$$

herein, the "GS" is the group unit based size control operation, the $\uplus^*$ is the convolution-merge of the direction map, the "TRIM" is the operation for eliminating the unnecessary portion of the self-cross and the like existing at the boundary, and the "1, −1" is a factor of the group unit based size control operation.

4. The method of claim 1, wherein in the fourth step, the one obtained by merging the direction maps of the obstacle and the moving object is calculated for external and internal offsets as in the following Equation:

$$D = DM(A_0) \uplus * DM(A_1) \quad 1)$$

$$TDC(GS(D, 1, R(t))) = \partial(A_0 \oplus (R(t) \cdot A_1)) = O_{out}(R(t)) \quad 2)$$

$$TDC(GS(D, 1, -R(t))) = \partial(A_0 \ominus (-R(t) \cdot A_1)) = O_e(R(t)) \quad 3)$$

Herein, the $O_{out}(R(t))$ and $O_e(R(t))$ respectively are external and internal offsets of the radius $R(t)$.

5. The method of claim 1, further comprising a step of performing the convolution merge of the direction map after Minkowski operation is determined in the third step and before the group unit based size control operation is performed, to allow to be reused in the group unit based size control operation using a different factor.

6. The method of claim 5, wherein in the convolution-merging step, when an operation condition of $D_s = D_0 \uplus D_1$ is satisfied, the same merged direction map $D_s$ is reused to calculate boundaries of the following four Minkowski operations:

$$TDC(GS(D_s, 1, 1)) = \partial(A_0 \oplus A_1), \quad 1)$$

$$TDC(GS(D_s, 1, -1)) = \partial(A_0 \ominus A_1), \quad 2)$$

$$TDC(GS(D_s, -1, 1)) = \partial(A_1 \ominus A_0), \quad 3)$$

$$TDC(GS(D_s, -1, -1)) = \partial(-A_0 \oplus -A_1), \text{and} \quad 4)$$

wherein when an operation condition of $D_d = -D_0 \uplus D_1$ is satisfied, the same merged direction map $D_d$ is reused to calculate boundaries of the following four Minkowski operations:

$$TDC(GS(D_d, 1, 1)) = \partial(-A_0 \oplus A_1), \quad 5)$$

$$TDC(GS(D_d, 1, -1)) = \partial(-A_1 \ominus A_0), \quad 6)$$

$$TDC(GS(D_d, -1, 1)) = \partial(A_0 \ominus A_1), \quad 7)$$

$$TDC(GS(D_d, -1, -1)) = \partial(A_0 \oplus -A_1), \quad 8)$$

herein, four factors of the group unit based size control operation applied to the Minkowski operation are respectively defined as "1,1", "1,−1", "−1,1" and "−1,−1".

7. The method of claims 5, wherein in the convolution-merging step, when the sizes of the obstacle and the object are respectively changed into $\alpha$ and $\beta$, the same merged direction map is reused to calculate the boundaries of four Minkowski operations irrespective of the size as in the following Equations:

$$TDC(GS(D_s, \alpha, \beta)) = \partial(\alpha A_0 \oplus \beta A_1), \quad 1)$$

$$TDC(GS(D_s, \alpha, -\beta)) = \partial(\alpha A_0 \ominus -\beta A_1), \quad 2)$$

$$TDC(GS(D_s, \{-\alpha, \beta\})) = \partial(\beta A_1 \ominus -\alpha A_0), \quad 3)$$

$$TDC(GS(D_s, -\alpha, -\beta)) = \partial(-\alpha A_0 \oplus -\beta A_1), \text{and} \quad 4)$$

$$TDC(GS(D_d, \alpha, \beta)) = \partial(-\alpha A_0 \oplus \beta A_1), \quad 5)$$

$$TDC(GS(D_d, \alpha, -\beta)) = \partial(\beta A_1 \ominus -\alpha A_1), \quad 6)$$

$$TDC(GS(D_d, -\alpha, \beta)) = \partial(\alpha A_0 \ominus \beta A_1), \quad 7)$$

$$TDC(GS(D_d, -\alpha, -\beta)) = \partial(\alpha A_0 \oplus -\beta A_1), \quad 8)$$

herein, the four factors of the group unit based size control operation applied to the Minkowski operation respectively are "$\alpha,\beta$", "$\alpha,-\beta$", "$-\alpha,\beta$" and "$-\alpha,-\beta$".

8. A computer-readable recording medium containing therein a computer program which, when executed by a computer, causes the computer to perform the method for generation of the 2-dimensional motion path claimed in claim 1.

9. A computer-readable recording medium containing therein a computer program which, when executed by a computer, causes the computer to perform the method for generation of the 2-dimensional motion path claimed in claim 2.

10. A computer-readable recording medium containing therein a computer program which, when executed by a computer, causes the computer to perform the method for generation of the 2-dimensional motion path claimed in claim 3.

11. A computer-readable recording medium containing therein a computer program which, when executed by a computer, causes the computer to perform the method for generation of the 2-dimensional motion path claimed in claim 4.

12. A computer-readable recording medium containing therein a computer program which, when executed by a computer, causes the computer to perform the method for generation of the 2-dimensional motion path claimed in claim 5.

13. A computer-readable recording medium containing therein a computer program which, when executed by a computer, causes the computer to perform the method for generation of the 2-dimensional motion path claimed in claim 6.

14. A computer-readable recording medium containing therein a computer program which, when executed by a computer, causes the computer to perform the method for generation of the 2-dimensional motion path claimed in claim 7.

* * * * *